(12) United States Patent
Zhang et al.

(10) Patent No.: US 9,143,964 B2
(45) Date of Patent: *Sep. 22, 2015

(54) DEVICES AND METHODS FOR DETECTING AND HANDLING DECONSTRUCTIVE IMPACTS OF DEFAULT WEIGHT FACTORS FOR CLOSED-LOOP TRANSMISSION DIVERSITY COMMUNICATIONS

(71) Applicant: QUALCOMM Incorporated, San Diego, CA (US)

(72) Inventors: Wei Zhang, Santa Clara, CA (US); Prashant Udupa Sripathi, Santa Clara, CA (US); Nate Chizgi, Sunnyvale, CA (US); Padmanabhan Ramakrishnan, San Diego, CA (US); Ke Ning, Sudbury, MA (US); Guang Xie, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/106,248

(22) Filed: Dec. 13, 2013

(65) Prior Publication Data

US 2014/0378070 A1 Dec. 25, 2014

Related U.S. Application Data

(60) Provisional application No. 61/836,826, filed on Jun. 19, 2013.

(51) Int. Cl.
*H04B 1/00* (2006.01)
*H04W 24/08* (2009.01)
(Continued)

(52) U.S. Cl.
CPC ............. *H04W 24/08* (2013.01); *H04B 7/0634* (2013.01); *H04B 7/0689* (2013.01); *H04B 7/0654* (2013.01)

(58) Field of Classification Search
CPC . H04W 52/24; H04W 52/241; H04W 52/242; H04W 52/243
USPC .................................................. 455/69, 67.13
See application file for complete search history.

(56) References Cited

U.S. PATENT DOCUMENTS 7,236,540 B2 6/2007 Nilsson
7,289,769 B2 10/2007 Brandes et al.
(Continued)

FOREIGN PATENT DOCUMENTS

EP 1608099 A1 12/2005
EP 1748579 A1 1/2007

OTHER PUBLICATIONS

"3rd Generation Partnership Project (3GPP); Technical Specification Group Radio Access Network Physical layer procedures (FDD) (3G TS 25.214 version 3.0.0)", 3GPP Standard; 3G TS 25 214 3rd Generation Partnership Project (3GPP), Mobile Competence Centre; 650, Route Des Lucioles; F-06921 Sophia-Antipolis Cedex; France, No. V3.0.0, Oct. 21, 1999, pp. 1-39, XP050400168.
(Continued)

*Primary Examiner* — Lee Nguyen
(74) *Attorney, Agent, or Firm* — Loza & Loza LLP

(57) ABSTRACT

UEs are adapted to facilitate detection and handling of deconstructive impacts of default weight factors employed before downlink and uplink synchronization is achieved in closed-loop transmission diversity communications. According to one example, a UE may receive transmissions sent using a default weight factor for transmission diversity. The UE may determine whether the default weight factor is causing a deconstructive impact on signal-to-interference ratio estimates for the received transmissions. When it is determined that the default weight factor is causing the deconstructive impact on the signal-to-interference ratio estimates for the received transmissions, the UE may employ an alternate closed-loop transmission diversity (CLTD) mode. Other aspects, embodiments, and features are also included.

25 Claims, 6 Drawing Sheets

(51) Int. Cl.
*H04B 7/06* (2006.01)
*H04B 1/66* (2006.01)

(56) References Cited

U.S. PATENT DOCUMENTS

| | | | |
|---|---|---|---|
| 7,961,774 | B2 | 6/2011 | Onggosanusi et al. |
| 8,078,177 | B2 | 12/2011 | Lindoff |
| 2004/0066754 | A1* | 4/2004 | Hottinen ................. 370/252 |
| 2012/0178381 | A1 | 7/2012 | Jiang et al. |
| 2012/0207045 | A1 | 8/2012 | Pelletier et al. |
| 2014/0378069 | A1* | 12/2014 | Zhang et al. ............ 455/67.13 |

OTHER PUBLICATIONS

International Search Report and Written Opinion—PCT/US2014/041854—ISA/EPO—Sep. 19, 2014.

Nokia: 3GPP Draft; R1-01-0347, 3rd Generation Partnership Project (3GPP), Mobile Competence Centre; 650, Route Des Lucioles; F-06921 Sophia-Antipolis Cedex; France, vol. RAN WG1, no. Las Vegas; 20010304, Mar. 4, 2001, XP050094597.

* cited by examiner

DEVICES AND METHODS FOR DETECTING AND HANDLING DECONSTRUCTIVE IMPACTS OF DEFAULT WEIGHT FACTORS FOR CLOSED-LOOP TRANSMISSION DIVERSITY COMMUNICATIONS

CLAIM OF PRIORITY UNDER 35 U.S.C. §119

The present Application for Patent claims priority to Provisional Application No. 61/836,826 entitled "Detecting and Handling the Deconstructive Impact of the Default CLTD Weight" filed Jun. 19, 2013, and assigned to the assignee hereof and hereby expressly incorporated by reference herein.

TECHNICAL FIELD

The technology discussed below relates generally to wireless communications, and more specifically to methods and devices for detecting and handling the deconstructive impacts of default weight factors in closed-loop transmission diversity communications.

BACKGROUND

Wireless communication networks are widely deployed to provide various communication services such as telephony, video, data, messaging, broadcasts, and so on. Such networks, which are usually multiple access networks, support communications for multiple users by sharing the available network resources. One example of such a network is the UMTS Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). UMTS, which is the successor to Global System for Mobile Communications (GSM) technologies, currently supports various air interface standards, such as Wideband-Code Division Multiple Access (W-CDMA), Time Division-Code Division Multiple Access (TD-CDMA), and Time Division-Synchronous Code Division Multiple Access (TD-SCDMA). UMTS also supports enhanced 3G data communications protocols, such as High Speed Packet Access (HSPA), which provides higher data transfer speeds and capacity to associated UMTS networks.

As the demand for mobile broadband access continues to increase, research and development continue to advance the UMTS technologies not only to meet the growing demand for mobile broadband access, but to advance and enhance the user experience with mobile communications.

BRIEF SUMMARY OF SOME EXAMPLES

The following summarizes some aspects of the present disclosure to provide a basic understanding of the discussed technology. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

Various examples and implementations of the present disclosure facilitate detection and handling of deconstructive impacts of default weight factors employed before downlink and uplink synchronization is achieved in closed-loop transmission diversity communications. According to one or more aspects of the disclosure, UEs may include a communications interface coupled with a processing circuit. The processing circuit may be adapted to determine whether a default weight factor is causing a deconstructive impact on signal-to-interference ratio estimates for transmissions received via the communications interface. The processing circuit may be further adapted to employ an alternate closed-loop transmission diversity mode when it is determined that the default weight factor is causing the deconstructive impact on the signal-to-interference ratio estimates for the received transmissions.

One or more further aspects of the disclosure provide methods operational on a UE and/or UEs including means for performing such methods. According to one or more examples, such methods may include receiving transmissions sent using a default weight factor for transmission diversity. A determination can be made that the default weight factor is causing a deconstructive impact on signal-to-interference ratio estimates for the received transmissions. In response to the determination that the default weight factor is causing the deconstructive impact on the signal-to-interference ratio estimates for the received transmissions, an alternate closed-loop transmission diversity mode may be employed.

Yet further aspects of the present disclosure provide processor-readable mediums including programming executable by a processing circuit. According to one or more examples, such programming may be adapted for causing a processing circuit to determine whether a default weight factor is causing a deconstructive impact on signal-to-interference ratio estimates for transmissions received via the communications interface. The programming may be further adapted for causing a processing circuit to employ an alternate closed-loop transmission diversity mode when it is determined that the default weight factor is causing the deconstructive impact on the signal-to-interference ratio estimates for the received transmissions.

Other aspects, features, and embodiments associated with the present disclosure will become apparent to those of ordinary skill in the art upon reviewing the following description in conjunction with the accompanying figures.

DRAWINGS

DETAILED DESCRIPTION

The description set forth below in connection with the appended drawings is intended as a description of various configurations and is not intended to represent the only configurations in which the concepts and features described herein may be practiced. The following description includes specific details for the purpose of providing a thorough understanding of various concepts. However, it will be apparent to those skilled in the art that these concepts may be practiced without these specific details. In some instances, well known circuits, structures, techniques and components are shown in block diagram form to avoid obscuring the described concepts and features.

The various concepts presented throughout this disclosure may be implemented across a broad variety of telecommunication systems, network architectures, and communication standards. Certain aspects of the disclosure are described below for UMTS and 3rd Generation Partnership Project (3GPP) protocols and systems, and related terminology may be found in much of the following description. However, those of ordinary skill in the art will recognize that one or more aspects of the present disclosure may be employed and included across a broad variety of telecommunication systems, network architectures, and communication standards.

Figure 1:
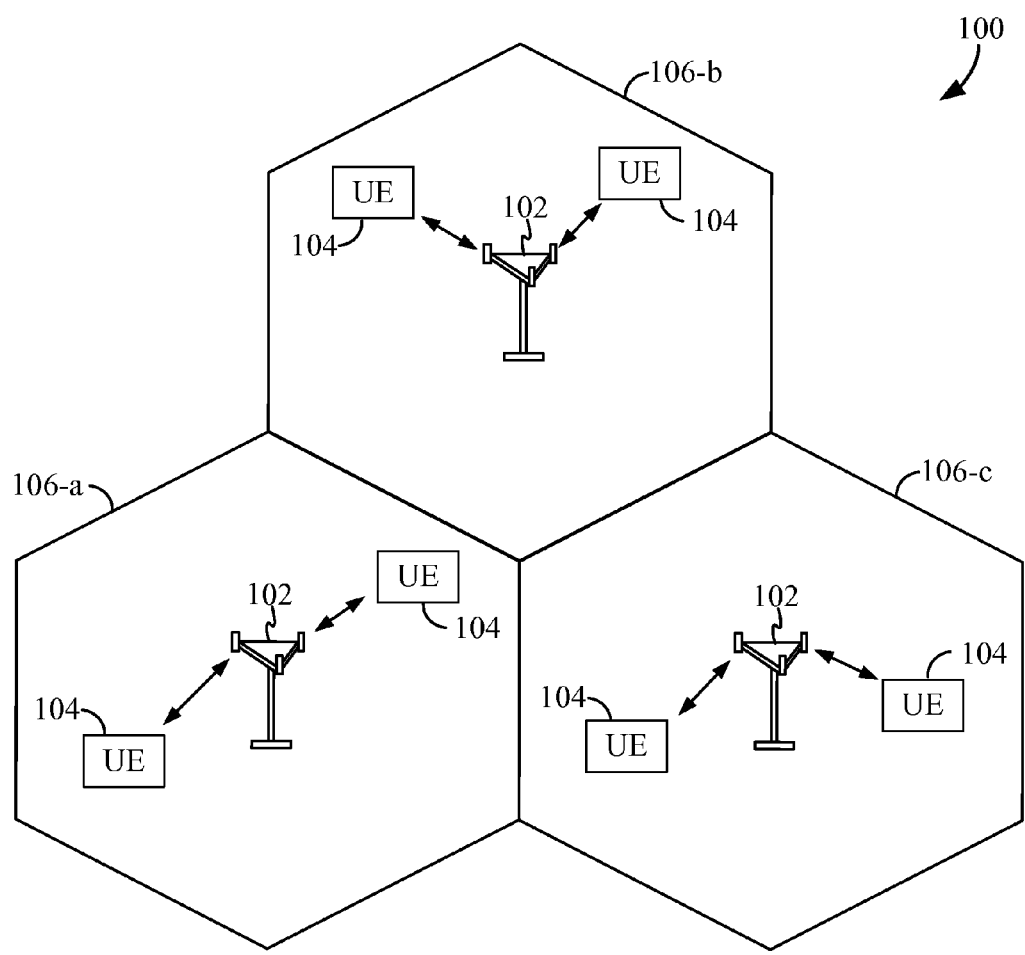
FIG. 1 is a conceptual diagram of a network environment in which one or more aspects of the present disclosure may find application.

Referring now to FIG. 1, a block diagram of a network environment in which one or more aspects of the present disclosure may find application is illustrated. The wireless communications system 100 is adapted to facilitate wireless communication between one or more base stations 102 and user equipments (UEs) 104. The base stations 102 and UEs 104 may be adapted to interact with one another through wireless signals. In some instances, such wireless interaction may occur on multiple carriers (waveform signals of different frequencies). Each modulated signal may carry control information (e.g., pilot signals), overhead information, data, etc.

The base stations 102 can wirelessly communicate with the UEs 104 via a base station antenna. The base stations 102 may each be implemented generally as a device adapted to facilitate wireless connectivity (for one or more UEs 104) to the wireless communications system 100. Such a base station 102 may also be referred to by those skilled in the art as a base transceiver station (BTS), a radio base station, a radio transceiver, a transceiver function, a basic service set (BSS), and extended service set (ESS), a node B, a femto cell, a pico cell, or some other suitable terminology.

Figure 2:
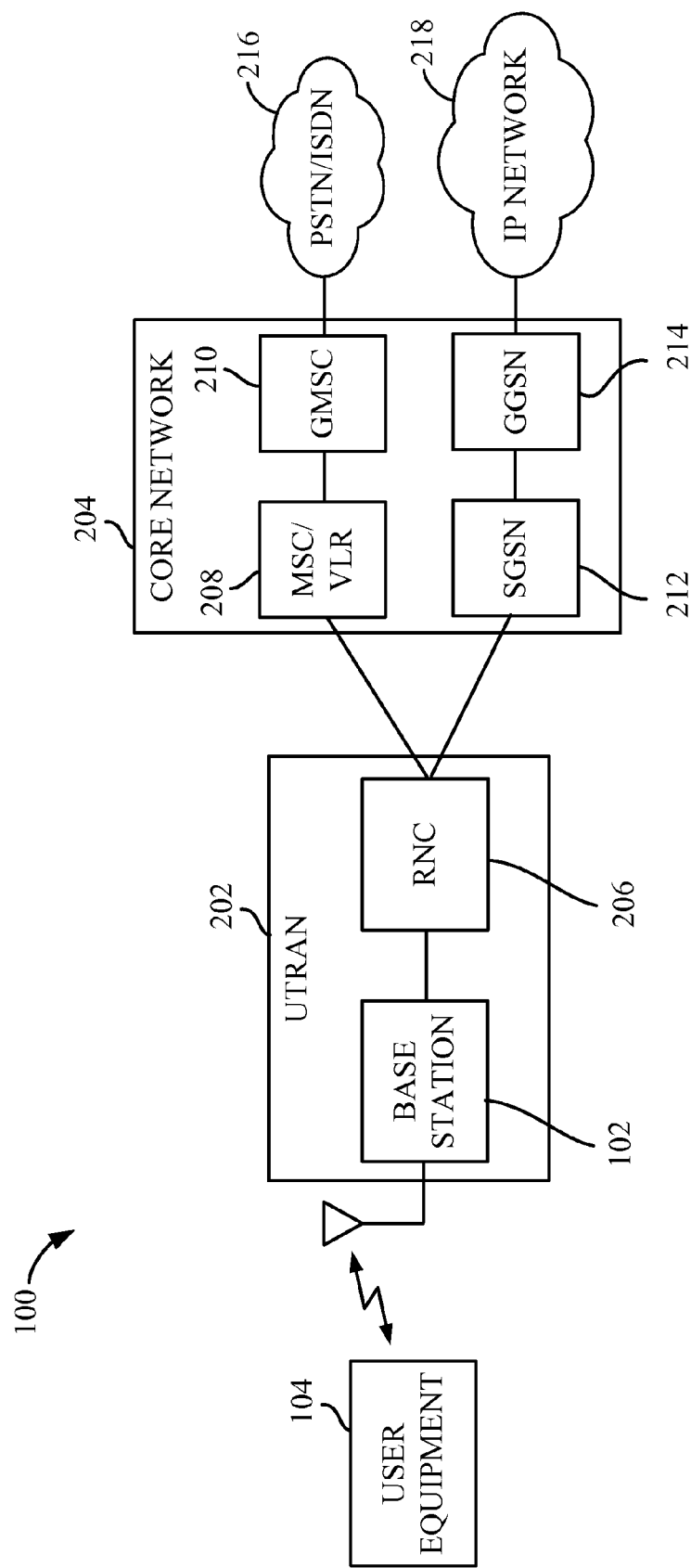
FIG. 2 is a block diagram illustrating select components of the wireless communication system of FIG. 1 according to at least one example.

The base stations 102 are configured to communicate with the UEs 104 under the control of a base station controller (see FIG. 2). Each of the base station 102 sites can provide communication coverage for a respective geographic area. The coverage area 106 for each base station 102 here is identified as cells 106A, 106B, or 106C. The coverage area 106 for a base station 102 may be divided into sectors (not shown, but making up only a portion of the coverage area). In various examples, the system 100 may include base stations 102 of different types.

One or more UEs 104 may be dispersed throughout the coverage areas 106. Each UE 104 may communicate with one or more base stations 102. A UE 104 may generally include one or more devices that communicate with one or more other devices through wireless signals. Such a UE 104 may also be referred to by those skilled in the art as an access terminal, a mobile station (MS), a subscriber station, a mobile unit, a subscriber unit, a wireless unit, a remote unit, a mobile device, a wireless device, a wireless communications device, a remote device, a mobile subscriber station, a mobile terminal, a wireless terminal, a remote terminal, a handset, a terminal, a user agent, a mobile client, a client, or some other suitable terminology. A UE 104 may include a mobile terminal and/or an at least substantially fixed terminal Examples of a UE 104 include a mobile phone, a pager, a wireless modem, a personal digital assistant, a personal information manager (PIM), a personal media player, a palmtop computer, a laptop computer, a tablet computer, a television, an appliance, an e-reader, a digital video recorder (DVR), a machine-to-machine (M2M) device, meter, entertainment device, router, and/or other communication/computing device which communicates, at least partially, through a wireless or cellular network.

Turning to FIG. 2, a block diagram illustrating select components of the wireless communication system 100 is depicted according to at least one example. As illustrated, the base stations 102 are included as at least a part of a radio access network (RAN), such as a UMTS Terrestrial Radio Access Network (UTRAN) 202. The UTRAN 202 is generally adapted to manage traffic and signaling between one or more UEs 104 and one or more other network entities, such as network entities included in a core network 204. A radio access network may, according to various implementations, be also implemented as a base station subsystem (BSS), an access network, a GSM Edge Radio Access Network (GERAN), etc.

In addition to one or more base stations 102, the UTRAN 202 can include a radio network controller (RNC) 206, which may also be referred to by those of skill in the art as a base station controller (BSC). The radio network controller 206 is generally responsible for the establishment, release, and maintenance of wireless connections within one or more coverage areas associated with the one or more base stations 102 which are connected to the radio network controller 206. The radio network controller 206 can be communicatively coupled to one or more nodes or entities of the core network 204.

The core network 204 is a portion of the wireless communications system 100 that provides various services to UEs 104 that are connected via the UTRAN 202. The core network 204 may include a circuit-switched (CS) domain and a packet-switched (PS) domain. Some examples of circuit-switched entities include a mobile switching center (MSC) and visitor location register (VLR), identified as MSC/VLR 208, as well as a Gateway MSC (GMSC) 210. Some examples of packet-switched elements include a Serving GPRS Support Node (SGSN) 212 and a Gateway GPRS Support Node (GGSN) 214. Other network entities may be included, such as an EIR, a HLR, a VLR and/or a AuC, some or all of which may be shared by both the circuit-switched and packet-switched domains. A UE 104 can obtain access to a public switched telephone network (PSTN) 216 via the circuit-switched domain, and to an IP network 218 via the packet-switched domain.

As base stations 102 communicate with UEs 104 within the wireless communications system 100, closed-loop transmission diversity (CLTD) may be used to improve RF performance. Closed-loop transmission diversity (CLTD) is defined in the 3GPP standards in document TS 25.214, and generally involves a transmitter employing more than one transmit antenna (typically two, where the second antenna is called a diversity antenna) to transmit a signal.

To assist the transmitter in choosing a transmission format, such as a weight factor (corresponding to a phase adjustment) to apply on the diversity antenna, the receiving device provides explicit feedback information to the transmitting device about the spatial channel. Before the first feedback information is received by the transmitting device from the receiving device, the transmitting device is typically configured to use a default initial weight factor for the diversity antenna. For example, in the 3GPP standards document TS 25.214, an initial weight of $w2=\frac{1}{2}(1+j)$ is to be used by a UTRAN 202 before the first feedback information is received. This means that before a synchronization is established between the downlink (i.e., from the UTRAN 202 to the UE 104) and the uplink (i.e., from the UE 104 to the UTRAN 202), both the UE 104 and the UTRAN 202 are expected to use the same default weight factor.

In some instances, use of the default weight factor has been determined to create problems to the downlink signal-to-interference ratio (SIR) estimate. One example of such a problem is when the signal from the primary transmit antenna and the signal from the diversity transmit antenna at the UTRAN 202 have a phase difference of about 135 degrees. When the phase difference is about 135 degrees, application of the default weight factor causes the resulting phase difference to be about 180 degrees. A 180 degree phase difference can result in signal cancellation. In such instances, the signal-to-interference ratio (SIR) estimate at the UE 104 receiving the transmission can be very small, and the UE 104 will often fail the synchronization procedure specified in Section 4 of the 3GPP standards document TS 25.214. Generally, an impact to the signal-to-interference ratio (SIR) estimates is observed most frequently when the phase difference between the signals from the primary antenna and the diversity antenna is between about 90 and 215 degrees.

Figure 3:
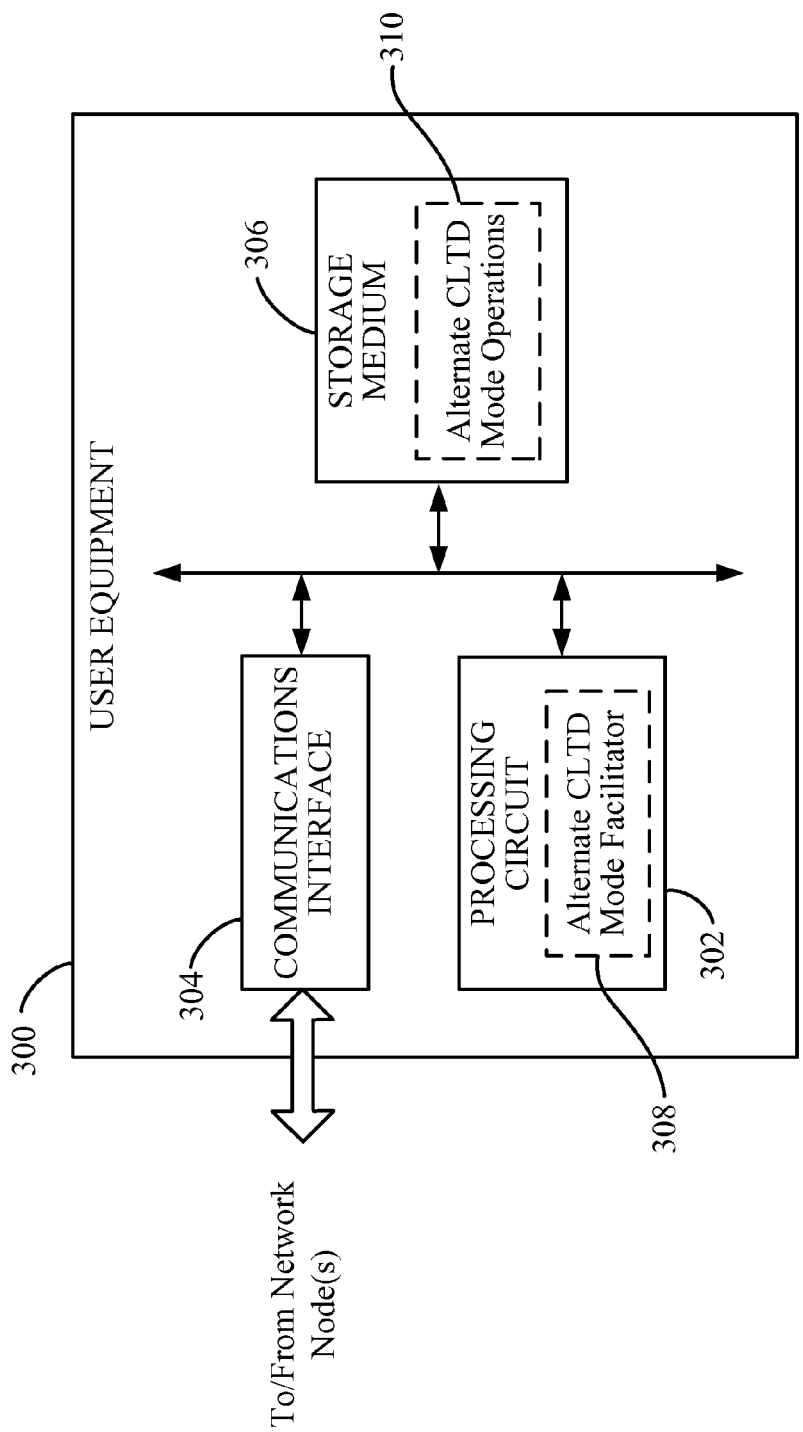
FIG. 3 is a block diagram illustrating select components of a user equipment (UE) according to at least one example.

According to an aspect of the present disclosure, UEs are adapted to detect and handle the deconstructive impact resulting from a default weight prior to uplink and downlink synchronization. Turning to FIG. 3, a block diagram is shown illustrating select components of a user equipment 300 according to at least one example of the present disclosure. The UE 300 includes a processing circuit 302 coupled to or placed in electrical communication with a communications interface 304 and a storage medium 306.

The processing circuit 302 is arranged to obtain, process and/or send data, control data access and storage, issue commands, and control other desired operations. The processing circuit 302 may include circuitry adapted to implement desired programming provided by appropriate media, and/or circuitry adapted to implement various functionality described throughout the present disclosure. For example, the processing circuit 302 may be implemented as one or more processors, one or more controllers, and/or other structure configured to execute executable programming Examples of the processing circuit 302 may include a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general purpose processor may include a microprocessor, as well as any conventional processor, controller, microcontroller, or state machine. The processing circuit 302 may also be implemented as a combination of computing components, such as a combination of a DSP and a microprocessor, a number of microprocessors, one or more microprocessors in conjunction with a DSP core, an ASIC and a microprocessor, or any other number of varying configurations. These examples of the processing circuit 302 are for illustration and other suitable configurations within the scope of the present disclosure are also contemplated.

The processing circuit 302 can be adapted for the execution of programming, which may be stored on the storage medium 306. As used herein, the term "programming" shall be construed broadly to include without limitation instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

In some instances, the processing circuit 302 may include an alternate closed-loop transmission diversity (CLTD) mode facilitator 308. The alternate CLTD mode facilitator 308 may include circuitry and/or programming (e.g., programming stored on the storage medium 306) adapted to detect deconstructive impacts resulting from a default weight factor employed prior to uplink and downlink synchronization, and to employ an alternative CLTD mode when the deconstructive impacts are detected.

The communications interface 304 is configured to facilitate wireless communications of the UE 300. For example, the communications interface 304 may include circuitry and/or programming adapted to facilitate the communication of information bi-directionally with respect to one or more wireless network devices (e.g., network nodes).

The storage medium 306 may represent one or more processor-readable devices for storing programming, such as processor executable code or instructions (e.g., software, firmware), electronic data, databases, or other digital information. The storage medium 306 may also be used for storing data that is manipulated by the processing circuit 302 when executing programming. The storage medium 306 may be any available media that can be accessed by a general purpose or special purpose processor, including portable or fixed storage devices, optical storage devices, and various other mediums capable of storing, containing and/or carrying programming By way of example and not limitation, the storage medium 306 may include a processor-readable storage medium such as a magnetic storage device (e.g., hard disk, floppy disk, magnetic strip), an optical storage medium (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, and/or other mediums for storing programming, as well as any combination thereof.

The storage medium 306 may be coupled to the processing circuit 302 such that the processing circuit 302 can read information from, and write information to, the storage medium 306. That is, the storage medium 306 can be coupled to the processing circuit 302 so that the storage medium 306 is at least accessible by the processing circuit 302, including examples where the storage medium 306 is integral to the processing circuit 302 and/or examples where the storage medium 306 is separate from the processing circuit 302 (e.g., resident in the UE 300, external to the UE 300, distributed across multiple entities).

Programming stored by the storage medium 306, when executed by the processing circuit 302, causes the processing circuit 302 to perform one or more of the various functions and/or process steps described herein. In at least some examples, the storage medium 306 may include alternate closed-loop transmission diversity (CLTD) mode operations 310 adapted to cause the processing circuit 302 to detect deconstructive impacts resulting from a default weight factor employed prior to uplink and downlink synchronization, and to employ an alternative CLTD mode when the deconstructive impacts are detected, as described herein. Thus, according to one or more aspects of the present disclosure, the processing circuit 302 is adapted to perform (in conjunction with the storage medium 306) any or all of the processes, functions, steps and/or routines for any or all of the UEs described herein (e.g., UE 104, UE 300). As used herein, the term "adapted" in relation to the processing circuit 302 may refer to the processing circuit 302 being one or more of configured, employed, implemented, and/or programmed (in conjunction with the storage medium 306) to perform a particular process, function, step and/or routine according to various features described herein.

Figure 4:
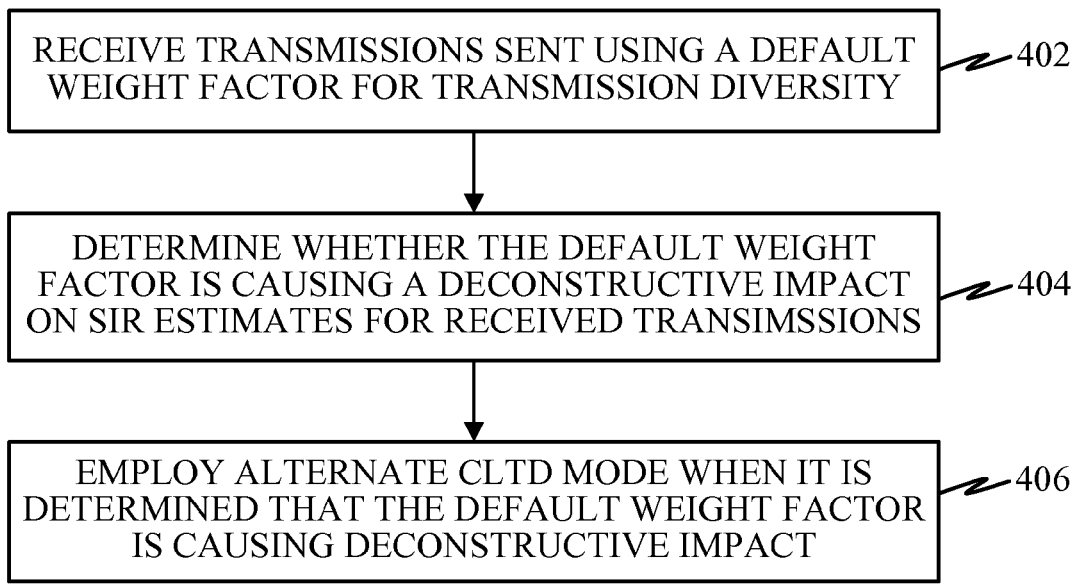
FIG. 4 is a flow diagram illustrating a method operational on a UE according to at least one example.

In operation, the UE 300 can employ an alternate downlink closed-loop transmission diversity (CLTD) mode prior to synchronization when it is determined that signals received from a diversity antenna of a network node are at least partially cancelling the signals received from a primary antenna of the network node when the diversity signal is rotated by the default weight factor. FIG. 4 is a flow diagram illustrating at least one example of a method operational on a UE, such as the UE 300. Referring to FIGS. 3 and 4, a UE 300 can receive transmissions that have been sent using transmission diversity, at 402. For example, the processing circuit 302 may receive downlink transmissions via the communications interface 304. The downlink transmissions can include signals sent by a plurality of different transmit antennas to facilitate transmission diversity. For instance, the downlink transmissions may include a first signal sent by a primary transmit antenna of a network node and a second signal sent by a diversity transmit antenna of the network node. In at least one example, the downlink transmissions may be dedicated pilot transmissions on a dedicated physical channel (DPCH), although any part of a dedicated physical channel (DPCH) may be employed.

The downlink transmissions are sent before downlink synchronization is obtained. Accordingly, the downlink transmissions may be sent using a default initial weight factor for the transmissions from the one or more diversity antennas of the network node. In one or more examples, the default initial weight factor applied to the diversity antenna is $w2=\frac{1}{2}(1+j)$ (e.g., an initial weight factor of 45 degrees).

At 404, the UE 300 can determine whether the default closed-loop transmission diversity (CLTD) weight factor is causing a deconstructive impact on the signal-to-interference ratio (SIR) estimates for received transmissions. For example, the processing circuit 302 (e.g., the alternate CLTD mode facilitator 308) executing the alternate CLTD mode operations 310 may determine whether the default CLTD weight factor used prior to downlink and uplink synchronization is built appears to be resulting in at least partial cancellation of the primary and diversity signals.

In at least one example, the UE 300 may make this determination based on the feedback information (FBI) for the received transmissions, which feedback information (FBI) is typically used by the UTRAN to generate a closed-loop transmission diversity (CLTD) weight factor. In general, when the UE 300 expects the same 45 degree weight factor as the default weight factor, all the feedback information (FBI) bits are expected to be a logic LOW (e.g., a 0). On the other hand, when the diversity transmission signal, after rotation by the default weight factor, is canceling the primary transmission signal, all the feedback information (FBI) bits are expected to be a logic HIGH (e.g., a 1). The UE 300 can, therefore, determine that the default closed-loop transmission diversity (CLTD) weight factor is causing a deconstructive impact on the signal-to-interference ratio (SIR) estimates for received transmissions when a predetermined number of slots include a predetermined number of feedback information (FBI) bits with a logic HIGH (e.g., a 1).

Figure 5:
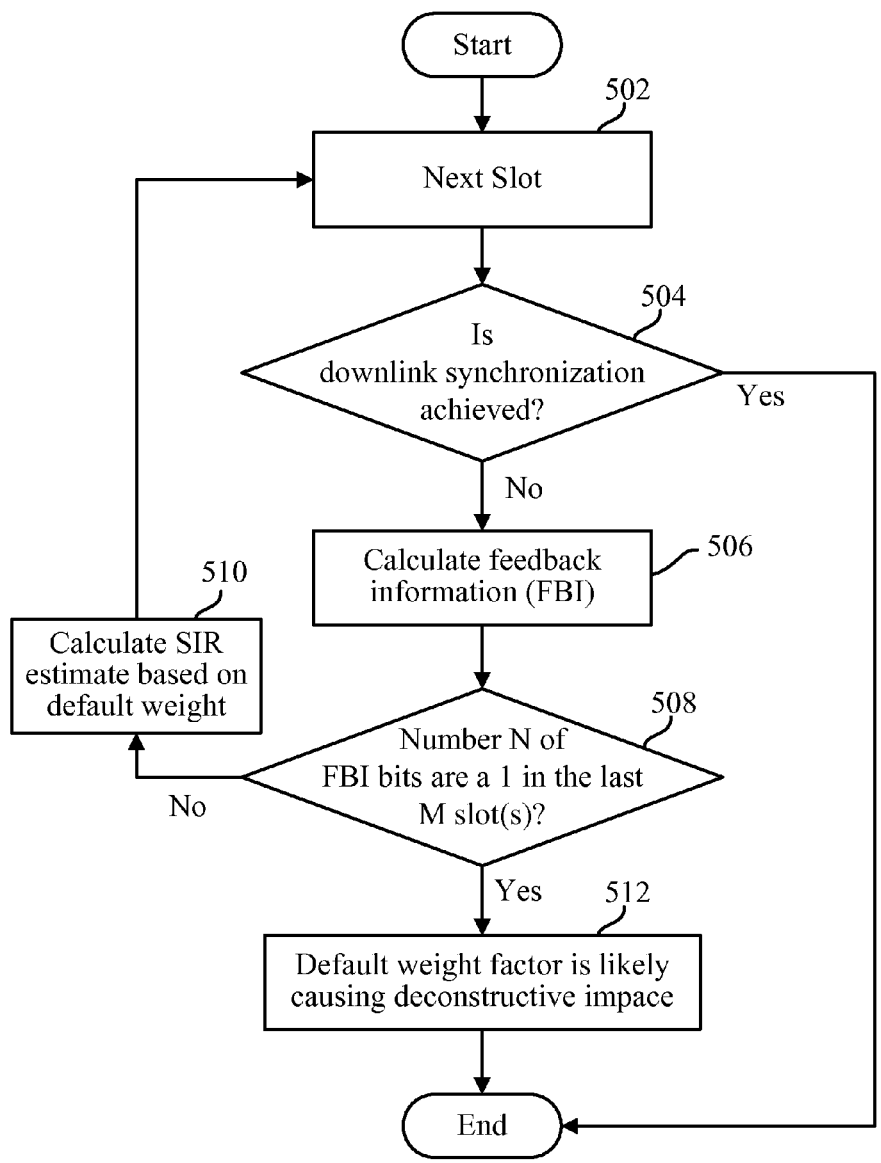
FIG. 5 is a flow diagram illustrating an example of a process for determining whether the default weight factor is causing a deconstructive impact on the signal-to-interference ratio (SIR) estimates for received transmissions.

Referring to FIG. 5, a flow diagram is shown illustrating an example of a process for determining whether the default weight factor is causing a deconstructive impact on the signal-to-interference ratio (SIR) estimates for received transmissions. Initially, the processing circuit 302 (e.g., the alternate CLTD mode facilitator 308) executing the alternate CLTD mode operations 310 may process a first slot at operation 502. At decision diamond 504, the processing circuit 302 (e.g., the alternate CLTD mode facilitator 308) executing the alternate CLTD mode operations 310 determines whether downlink synchronization is achieved. If downlink synchronization is achieved, the processing circuit 302 (e.g., the alternate CLTD mode facilitator 308) executing the alternate CLTD mode operations 310 can employ the conventional CLTD operations (e.g., as described in the 3GPP standards document TS 25.214).

If downlink synchronization has not been achieved, the processing circuit 302 (e.g., the alternate CLTD mode facilitator 308) executing the alternate CLTD mode operations 310 can calculate feedback information (FBI) at operation 506. The feedback information (FBI) typically results in a logic HIGH (e.g., a 1) or a logic LOW (e.g., a 0).

At decision diamond 508, the processing circuit 302 (e.g., the alternate CLTD mode facilitator 308) executing the alternate CLTD mode operations 310 determines whether a number N of FBI bits are a logic HIGH (e.g., a 1) value in the last M slots. The predetermined values 'N' and 'M' are configurable parameters such that, when this condition is satisfied, the processing circuit 302 (e.g., the alternate CLTD mode facilitator 308) executing the alternate CLTD mode operations 310 can determine that the default weight factor is causing a deconstructive impact on the signal-to-interference ratio (SIR) estimates.

Accordingly, if the number of feedback information (FBI) bits with a logic HIGH value (e.g., a 1) is not equal to or greater than the predetermined value 'N' for the last 'M' slots, the processing circuit 302 (e.g., the alternate CLTD mode facilitator 308) executing the alternate CLTD mode operations 310 can continue to calculate the signal-to-interference ratio (SIR) estimate for the current slot based on the default weight factor at operation 510. On the other hand, if the number of feedback information (FBI) bits with a logic HIGH value (e.g., a 1) is equal to or greater than the predetermined value 'N' for the last 'M' slots, the processing circuit 302 (e.g., the alternate CLTD mode facilitator 308) executing the alternate CLTD mode operations 310 can conclude that the default weight factor is likely causing a deconstructive impact on the signal-to-interference ratio (SIR) estimates for the received transmissions at operation 512.

Referring again to FIG. 4, the UE 300 can employ an alternate CLTD mode when it is determined that the default weight factor is causing deconstructive impact, at 406. For example, the processing circuit 302 (e.g., the alternate CLTD mode facilitator 308) executing the alternate CLTD mode operations 310 can employ an alternate CLTD mode (which may also be referred to as an "alternate initialization mode") in response to a determination that the default weight factor is likely causing deconstructive impact on the signal-to-interference ratio (SIR) estimates. The alternate CLTD mode is adapted to deal with the deconstructive impact due to the default weight factor.

Figure 6:
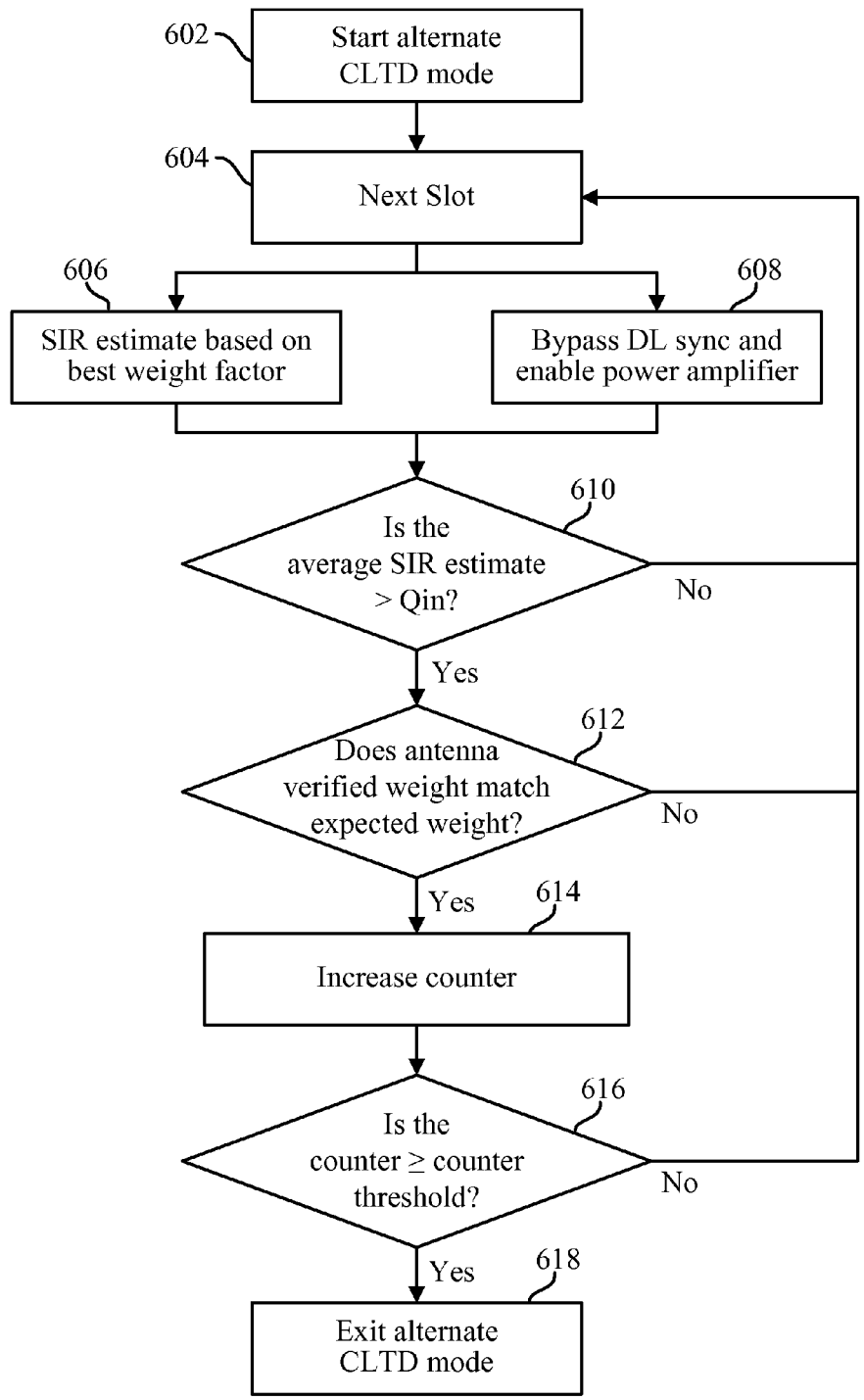
FIG. 6 is a flow diagram illustrating an example of a process for employing the alternate CLTD mode.

Referring to FIG. 6, a flow diagram is shown illustrating an example of a process for employing the alternate CLTD mode. At operation 602, the processing circuit 302 (e.g., the alternate CLTD mode facilitator 308) executing the alternate CLTD mode operations 310 can initiate the alternate CLTD mode. At operation 604, the processing circuit 302 (e.g., the alternate CLTD mode facilitator 308) executing the alternate CLTD mode operations 310 can obtain a first slot to be processed.

With the next slot obtained, the process can employ one of two options. A first option includes operation 606, where the processing circuit 302 (e.g., the alternate CLTD mode facilitator 308) executing the alternate CLTD mode operations 310 can recalculate the signal-to-interference ratio (SIR) estimate based on the best weight factor, instead of just using the default weight factor. For example, the processing circuit 302 (e.g., the alternate CLTD mode facilitator 308) executing the alternate CLTD mode operations 310 can calculate a plurality of signal-to-interference ratio (SIR) estimates using weight factors selected from a group of weight factors including 45 degrees, 135 degrees, negative 45 (−45) degrees, and negative 135 (−135) degrees. The processing circuit 302 (e.g., the alternate CLTD mode facilitator 308) executing the alternate CLTD mode operations 310 can then select the signal-to-interference ratio (SIR) estimate with the highest value.

A second option includes operation 608, where the processing circuit 302 (e.g., the alternate CLTD mode facilitator 308) executing the alternate CLTD mode operations 310 can bypass the synchronization detection. In addition, the processing circuit 302 (e.g., the alternate CLTD mode facilitator 308) executing the alternate CLTD mode operations 310 can enable the power amplifier for transmission from the UE 300.

Irrespective of which option is employed by the UE 300 (operation 606 or 608), the processing circuit 302 (e.g., the alternate CLTD mode facilitator 308) executing the alternate CLTD mode operations 310 determines at decision diamond 610 whether the average signal-to-interference ratio (SIR) estimate is greater than the Qin value in each frame. The Qin value refers to a threshold that the average signal-to-interference ratio (SIR) estimate is compared with to determine whether the UE 300 is synchronized. Generally speaking, the UE 300 is synchronized when the average signal-to-interference ratio (SIR) estimate is greater than Qin. The Qin value can be indirectly determined by tests specified in the 3GPP standards documents.

At decision diamond 610, the processing circuit 302 (e.g., the alternate CLTD mode facilitator 308) executing the alternate CLTD mode operations 310 can therefore determine whether the average value of the recalculated signal-to-interference ratio (SIR) estimates or the average value of the original signal-to-interference ratio (SIR) estimates, depending on which option is used, is higher than the Qin value for each frame. If the average value of the signal-to-interference ratio (SIR) estimates is not greater than the Qin value, then the processing circuit 302 (e.g., the alternate CLTD mode facilitator 308) executing the alternate CLTD mode operations 310 returns to operation 604 to process the next slot in the alternate CLTD mode.

If the average value of the signal-to-interference ratio (SIR) estimates is greater than the Qin value, then the processing circuit 302 (e.g., the alternate CLTD mode facilitator 308) executing the alternate CLTD mode operations 310 determines at decision diamond 612 whether the antenna verified weight factor at least substantially matches with the expected weight factor based on the feedback information (FBI) in each slot. If the antenna verified weight factor does not at least substantially match the expected weight factor, then the processing circuit 302 (e.g., the alternate CLTD mode facilitator 308) executing the alternate CLTD mode operations 310 returns to operation 604 to process the next slot in the alternate CLTD mode.

If the antenna verified weight factor does at least substantially match the expected weight factor, then the processing circuit 302 (e.g., the alternate CLTD mode facilitator 308) executing the alternate CLTD mode operations 310 increases a counter by 1 at operation 614. The counter is initialized as 0 when the UE 300 enters the alternate CLTD mode, and the is increased each time a slot is determined to include an antenna verified weight factor at least substantially matching the expected weight factor.

At decision diamond 616, the processing circuit 302 (e.g., the alternate CLTD mode facilitator 308) executing the alternate CLTD mode operations 310 determines whether the counter is greater than or equal to a predetermined counter threshold. If the counter is not greater than or equal to the counter threshold, the processing circuit 302 (e.g., the alternate CLTD mode facilitator 308) executing the alternate CLTD mode operations 310 returns to operation 604 to process the next slot in the alternate CLTD mode. On the other hand, when the counter is equal to or greater than the counter threshold, the processing circuit 302 (e.g., the alternate CLTD mode facilitator 308) executing the alternate CLTD mode operations 310 exits the alternate CLTD mode at operation 618. When the processing circuit 302 (e.g., the alternate CLTD mode facilitator 308) executing the alternate CLTD mode operations 310 exits the alternate CLTD mode, the UE 300 should be at a relatively improved situation, with both the downlink and uplink communicating to each other, such that the UE 300 can continue with a conventional CLTD operation (e.g., as described in the 3GPP standards document TS 25.214).

By implementing one or more of the features described herein, a UE can avoid instances where it is unable to build synchronization as a result of the default initial weight factor causing at least partial cancellation of the transmission diversity signals. While the above discussed aspects, arrangements, and embodiments are discussed with specific details and particularity, one or more of the components, steps, features and/or functions illustrated in FIGS. 1, 2, 3, 4, 5, and/or 6 may be rearranged and/or combined into a single component, step, feature or function or embodied in several components, steps, or functions. Additional elements, components, steps, and/or functions may also be added or not utilized without departing from the present disclosure. The apparatus, devices and/or components illustrated in FIGS. 1, 2, and/or 3 may be configured to perform or employ one or more of the methods, features, parameters, and/or steps described in FIGS. 4, 5, and/or 6. The novel algorithms described herein may also be efficiently implemented in software and/or embedded in hardware.

While features of the present disclosure may have been discussed relative to certain embodiments and figures, all embodiments of the present disclosure can include one or more of the advantageous features discussed herein. In other words, while one or more embodiments may have been discussed as having certain advantageous features, one or more of such features may also be used in accordance with any of the various embodiments discussed herein. In similar fashion, while exemplary embodiments may have been discussed herein as device, system, or method embodiments, it should be understood that such exemplary embodiments can be implemented in various devices, systems, and methods.

Also, it is noted that at least some implementations have been described as a process that is depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function. The various methods described herein may be partially or fully implemented by programming (e.g., instructions and/or data) that may be stored in a machine-readable, computer-readable, and/or processor-readable storage medium, and executed by one or more processors, machines and/or devices.

Those of skill in the art would further appreciate that the various illustrative logical blocks, modules, circuits, and algorithm steps described in connection with the embodiments disclosed herein may be implemented as hardware, software, firmware, middleware, microcode, or any combination thereof. To clearly illustrate this interchangeability, various illustrative components, blocks, modules, circuits, and steps have been described above generally in terms of their functionality. Whether such functionality is implemented as hardware or software depends upon the particular application and design constraints imposed on the overall system.

The various features associate with the examples described herein and shown in the accompanying drawings can be implemented in different examples and implementations without departing from the scope of the present disclosure. Therefore, although certain specific constructions and arrangements have been described and shown in the accompanying drawings, such embodiments are merely illustrative and not restrictive of the scope of the disclosure, since various other additions and modifications to, and deletions from, the described embodiments will be apparent to one of ordinary skill in the art. Thus, the scope of the disclosure is only determined by the literal language, and legal equivalents, of the claims which follow.

What is claimed is:

1. A user equipment, comprising:
a communications interface; and
a processing circuit coupled to the communications interface, the processing circuit adapted to:
determine whether a default weight factor is causing a deconstructive impact on signal-to-interference ratio estimates for transmissions received via the communications interface; and
employ an alternate closed-loop transmission diversity mode when it is determined that the default weight factor is causing the deconstructive impact on the signal-to-interference ratio estimates for the received transmissions.

2. The user equipment of claim 1, wherein the processing circuit adapted to determine whether the default weight factor is causing a deconstructive impact on signal-to-interference ratio estimates for transmissions comprises the processing circuit adapted to:
calculate feedback information for a predetermined number of slots; and
determine that the default weight factor is causing a deconstructive impact when a predetermined number of feedback information bits in the predetermined number of slots have a logic HIGH value.

3. The user equipment of claim 1, wherein the processing circuit adapted to employ the alternate closed-loop transmission diversity mode comprises the processing circuit adapted to:
calculate a plurality of signal-to-interference ratio estimates, wherein each signal-to-interference ratio estimate employs a different weight factor;
select a signal-to-interference ratio estimate with a highest value from among the plurality of calculated signal-to-interference ratio estimates;
determine that an average signal-to-interference ratio estimate is greater than Qin in each frame; and
determine that an antenna verified weight factor at least substantially matches an expected weight factor based on feedback information calculated for each slot.

4. The user equipment of claim 3, wherein the processing circuit is further adapted to:
increase a counter for each slot for which the antenna verified weight factor at least substantially matches the expected weight factor; and
exit the alternate CLTD mode when the count of the counter is equal to or greater than a predefined threshold.

5. The user equipment of claim 1, wherein the processing circuit adapted to employ the alternate closed-loop transmission diversity mode comprises the processing circuit adapted to:
bypass downlink synchronization detection;
determine that an average signal-to-interference ratio estimate is greater than Qin in each frame; and
determine that an antenna verified weight factor at least substantially matches an expected weight factor based on feedback information calculated for each slot.

6. The user equipment of claim 5, wherein the processing circuit is further adapted to:
increase a counter for each slot for which the antenna verified weight factor at least substantially matches the expected weight factor; and
exit the alternate CLTD mode when the count of the counter is equal to or greater than a predefined threshold.

7. A method operational on a user equipment, comprising:
receiving transmissions sent using a default weight factor for transmission diversity;
determining that the default weight factor is causing a deconstructive impact on signal-to-interference ratio estimates for the received transmissions; and
employing an alternate closed-loop transmission diversity mode in response to the determination that the default weight factor is causing the deconstructive impact on the signal-to-interference ratio estimates for the received transmissions.

8. The method of claim 7, wherein determining that the default weight factor is causing a deconstructive impact on signal-to-interference ratio estimates for the received transmissions comprises:
determining that the default weight factor is causing a deconstructive impact on signal-to-interference ratio estimates for the received transmissions based on feedback information calculated for the received transmissions.

9. The method of claim 8, wherein determining that the default weight factor is causing a deconstructive impact on signal-to-interference ratio estimates for the received transmissions based on feedback information calculated for the received transmissions comprises:
calculating feedback information for a predetermined number of slots; and
determining that the default weight factor is causing a deconstructive impact when a predetermined number of feedback information bits in the predetermined number of slots have a logic HIGH value.

10. The method of claim 7, wherein employing the alternate closed-loop transmission diversity mode comprises:
calculating a plurality of signal-to-interference ratio estimates for each slot, wherein each signal-to-interference ratio estimate employs a different weight factor;

selecting for each slot a signal-to-interference ratio estimate with a highest value from among the plurality of calculated signal-to-interference ratio estimates;
determining whether an average signal-to-interference ratio estimate is greater than Qin in each frame; and
determining whether an antenna verified weight factor at least substantially matches an expected weight factor based on feedback information calculated for each slot.

11. The method of claim 10, further comprising:
increasing a counter each time a slot is determined to include an antenna verified weight factor at least substantially matching the expected weight factor; and
exiting the alternate CLTD mode when the count of the counter is equal to or greater than a predefined threshold.

12. The method of claim 7, wherein employing the alternate closed-loop transmission diversity mode comprises:
bypassing downlink synchronization detection;
determining that an average signal-to-interference ratio estimate is greater than Qin in each frame; and
determining that an antenna verified weight factor at least substantially matches an expected weight factor based on feedback information calculated for each slot.

13. The method of claim 12, further comprising:
increasing a counter for each slot for which the antenna verified weight factor at least substantially matches the expected weight factor; and
exiting the alternate CLTD mode when the count of the counter is equal to or greater than a predefined threshold.

14. A user equipment, comprising:
means for receiving transmissions sent using a default weight factor for transmission diversity;
means for determining that the default weight factor is causing a deconstructive impact on signal-to-interference ratio estimates for the received transmissions; and
means for employing an alternate closed-loop transmission diversity mode in response to the determination that the default weight factor is causing the deconstructive impact on the signal-to-interference ratio estimates for the received transmissions.

15. The user equipment of claim 14, wherein the means for determining that the default weight factor is causing a deconstructive impact on signal-to-interference ratio estimates for the received transmissions comprises:
means for calculating feedback information for a predetermined number of slots; and
means for determining that the default weight factor is causing a deconstructive impact when a predetermined number of feedback information bits in the predetermined number of slots have a logic HIGH value.

16. The user equipment of claim 14, wherein the means for employing the alternate closed-loop transmission diversity mode comprises:
means for calculating a plurality of signal-to-interference ratio estimates for each slot, wherein each signal-to-interference ratio estimate employs a different weight factor;
means for selecting for each slot a signal-to-interference ratio estimate with a highest value from among the plurality of calculated signal-to-interference ratio estimates;
means for determining whether an average signal-to-interference ratio estimate is greater than Qin in each frame; and
means for determining whether an antenna verified weight factor at least substantially matches an expected weight factor based on feedback information calculated for each slot.

17. The user equipment of claim 16, further comprising:
means for increasing a counter each time a slot is determined to include an antenna verified weight factor at least substantially matching the expected weight factor; and
means for exiting the alternate CLTD mode when the count of the counter is equal to or greater than a predefined threshold.

18. The user equipment of claim 14, wherein the means for employing the alternate closed-loop transmission diversity mode comprises:
means for bypassing downlink synchronization detection;
means for determining whether an average signal-to-interference ratio estimate is greater than Qin in each frame; and
means for determining whether an antenna verified weight factor at least substantially matches an expected weight factor based on feedback information calculated for each slot.

19. The user equipment of claim 18, further comprising:
means for increasing a counter each time a slot is determined to include an antenna verified weight factor at least substantially matching the expected weight factor; and
means for exiting the alternate CLTD mode when the count of the counter is equal to or greater than a predefined threshold.

20. A processor-readable storage medium device, comprising programming for causing a processing circuit to:
determine whether a default weight factor is causing a deconstructive impact on signal-to-interference ratio estimates for transmissions received via the communications interface; and
employ an alternate closed-loop transmission diversity mode when it is determined that the default weight factor is causing the deconstructive impact on the signal-to-interference ratio estimates for the received transmissions.

21. The processor-readable storage medium device of claim 20, wherein the programming for causing a processing circuit to determine whether a default weight factor is causing a deconstructive impact on signal-to-interference ratio estimates for transmissions received via the communications interface comprises programming for causing a processing circuit to:
calculate feedback information for a predetermined number of slots; and
determine that the default weight factor is causing a deconstructive impact when a predetermined number of feedback information bits in the predetermined number of slots have a logic HIGH value.

22. The processor-readable storage medium device of claim 20, wherein the programming for causing a processing circuit to employ the alternate closed-loop transmission diversity mode comprises programming for causing a processing circuit to:
calculate a plurality of signal-to-interference ratio estimates for each slot, wherein each signal-to-interference ratio estimate employs a different weight factor;
select a signal-to-interference ratio estimate with a highest value from among the plurality of calculated signal-to-interference ratio estimates;
determine whether an average signal-to-interference ratio estimate is greater than Qin in each frame; and
determine whether an antenna verified weight factor at least substantially matches an expected weight factor based on feedback information calculated for each slot.

23. The processor-readable storage medium device of claim 22, further comprising programming for causing a processing circuit to:
   increase a counter each time a slot is determined to include an antenna verified weight factor at least substantially matching the expected weight factor; and
   exit the alternate CLTD mode when the count of the counter is equal to or greater than a predefined threshold.

24. The processor-readable storage medium device of claim 20, wherein the programming for causing a processing circuit to employ the alternate closed-loop transmission diversity mode comprises programming for causing a processing circuit to:
   bypass downlink synchronization detection;
   determine whether an average signal-to-interference ratio estimate is greater than Qin in each frame; and
   determine whether an antenna verified weight factor at least substantially matches an expected weight factor based on feedback information calculated for each slot.

25. The processor-readable storage medium device of claim 24, further comprising programming for causing a processing circuit to:
   increase a counter each time a slot is determined to include an antenna verified weight factor at least substantially matching the expected weight factor; and
   exit the alternate CLTD mode when the count of the counter is equal to or greater than a predefined threshold.

* * * * *